United States Patent
Alriksson et al.

(10) Patent No.: US 10,880,794 B2
(45) Date of Patent: Dec. 29, 2020

(54) INTER-BAND HANDOVER OF THE SAME PHYSICAL FREQUENCY

(71) Applicant: Telefonaktiebolaget LM Ericsson (publ), Stockholm (SE)

(72) Inventors: Peter Alriksson, Hörby (SE); Maria Ulander, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/328,390

(22) PCT Filed: Sep. 1, 2016

(86) PCT No.: PCT/EP2016/070609
§ 371 (c)(1),
(2) Date: Feb. 26, 2019

(87) PCT Pub. No.: WO2018/041353
PCT Pub. Date: Mar. 8, 2018

(65) Prior Publication Data
US 2020/0092766 A1  Mar. 19, 2020

(51) Int. Cl.
*H04W 36/00* (2009.01)

(52) U.S. Cl.
CPC ... *H04W 36/0069* (2018.08); *H04W 36/0058* (2018.08); *H04W 36/0072* (2013.01)

(58) Field of Classification Search
CPC ......... H04W 36/0069; H04W 36/0058; H04W 36/0072
(Continued)

(56) References Cited

U.S. PATENT DOCUMENTS

| 9,585,035 | B2 | 2/2017 | Awano et al. |
| 9,722,761 | B2* | 8/2017 | Bergljung ............... H04L 5/001 |
| 2011/0237202 | A1 | 9/2011 | Uemura et al. |

FOREIGN PATENT DOCUMENTS

| CN | 105704720 A | 6/2016 |
| CN | 105790907 A | 7/2016 |

(Continued)

OTHER PUBLICATIONS

3GPP TSG-RAN WG2 #81 bis Chicago, USAI Apr. 15-19, 2013 Tdoc R2-131511 (Year: 2013).*

(Continued)

*Primary Examiner* — Amancio Gonzalez
(74) *Attorney, Agent, or Firm* — Coats + Bennett, PLLC

(57) ABSTRACT

A method of an access network node of a carrier aggregation enabled cellular wireless communication system, and a method of a wireless terminal device of a carrier aggregation enabled cellular wireless communication system are disclosed. The method for the network node comprises identifying a need for an inter-band handover where a same physical frequency on which the access network node interacts with a wireless terminal device has more than one logical reference, wherein the wireless terminal device currently operates using a first logical reference, assigning a target frequency for the inter-band handover as a second logical reference for the physical frequency, and performing handover signalling with the wireless terminal device including the assigned target frequency. The method of the wireless terminal device comprises performing operation where a need for an inter-band handover occurs where a same physical frequency on which the wireless terminal device interacts with an access network node of the cellular wireless communication system has more than one logical reference, wherein the wireless terminal device currently operates using a first logical reference, and performing handover signalling with the access network node including receiving an assigned target frequency which is a second logical reference for the physical frequency. A network node, a wireless terminal device and computer programs for these for implementing the methods are also disclosed.

20 Claims, 4 Drawing Sheets

(58) Field of Classification Search
USPC .......................................................... 455/537
See application file for complete search history.

(56) References Cited

FOREIGN PATENT DOCUMENTS

| EP | 2343946 A2 | 1/2011 |
|---|---|---|
| EP | 2341730 A1 | 6/2011 |
| JP | 2011239387 A | 11/2011 |
| JP | 2012182795 A | 9/2012 |
| JP | 2015231152 A | 12/2015 |
| JP | 2016111510 A | 6/2016 |
| WO | 2014064616 A1 | 5/2014 |

OTHER PUBLICATIONS

3rd Generation Partnership Project, "3rd Generation Partnership Project; Technical Specification Group Radio Access Network; Evolved Universal Terrestrial Radio Access (E-UTRA); Radio Resource Control (RRC); Protocol specification (Release 13)", Technical Specification, 3GPP TS 36.331 V13.2.0, Jun. 1, 2016, pp. 1-623, 3GPP, France.

New Postcom, "Discussion on MFBI UE measurement", 3GPP TSG RAN WG2 Meeting #81bis, Chicago, USA, Apr. 15, 2013, pp. 1-2, R2-130999, 3GPP.

Ericsson, "Summary of offline discussion on MFBI", 3GPP TSG-RAN WG2 #81bis, Chicago, USA, Apr. 15, 2013, pp. 1-2, Tdoc R2-131511, 3GPP.

3rd Generation Partnership Project, "LTE; Evolved Universal Terrestrial Radio Access (E-UTRA); User Equipment (UE) radio transmission and reception", (3GPP TS 36.101 version 13.2.1 Release 13), Technical Specification, ETSI TS 136 101 V13.2.1, May 1, 2016, pp. 1-894, ETSI.

3rd Generation Partnership Project, "LTE; Evolved Universal Terrestrial Radio Access (E-UTRA); Radio Resource Control (RRC); Protocol Specification", (3GPP TS 36.331 version 13.0.0 Release 13), Technical Specification, ETSI TS 136 331 V13.0.0, Jan. 1, 2016, pp. 1-670, ETSI.

3GPP TSG-RAN WG2 #81bis, MFBI issues, Ericsson, ST-Ericsson, Chicago, USA, Apr. 15-19, 2013, Tdoc R2-131421.

3rd Generation Partnership Project; Technical Specification Group Radio Access Network; Evolved Universal Terrestrial Radio Access (E-UTRA); User Equipment (UE) radio transmission and reception (Release 13) 3GPP TS 36.101 V13.4.0 (Jun. 2016).

\* cited by examiner

INTER-BAND HANDOVER OF THE SAME PHYSICAL FREQUENCY

TECHNICAL FIELD

The present invention generally relates to a method of an access network node of a carrier aggregation enabled cellular wireless communication system, and a method of a wireless terminal device of a carrier aggregation enabled cellular wireless communication system, and corresponding access network node, wireless terminal device and computer programs for them. In particular, the method for the network node comprises identifying a need for an inter-band handover where a same physical frequency on which the access network node interacts with a wireless terminal device has more than one logical reference, wherein the wireless terminal device currently operates using a first logical reference, assigning a target frequency for the inter-band handover as a second logical reference for the physical frequency, and performing handover signalling with the wireless terminal device including the assigned target frequency. The method of the wireless terminal device comprises performing operation where a need for an inter-band handover occurs where a same physical frequency on which the wireless terminal device interacts with an access network node of the cellular wireless communication system has more than one logical reference, wherein the wireless terminal device currently operates using a first logical reference, and performing handover signalling with the access network node including receiving an assigned target frequency which is a second logical reference for the physical frequency.

BACKGROUND

Carrier aggregation is one approach for enhancing capacity in a wireless communication system. The aggregation of carriers provides increased bandwidth to use for a connection. On the other hand, the possibility to carrier aggregation also implies additional complexity in sense of setup and signalling.

EP 2343946 A2 discloses an approach where a set of logical channel priorities are sent from an access network node to a wireless terminal device, wherein the wireless terminal device selects carriers based on the logical channel priorities.

A problem that may arise is reliability in operation when setting up the carrier aggregation communication. In particular, some actions for setting up the carrier aggregation communication may increase the risk for lost connection between access network node and wireless terminal device. It is therefore desired to provide a solution which decreases such risk.

SUMMARY

The invention is based on the inventors' realization that in some communication systems relations between logical references to frequencies and the actual physical frequencies are not always one-to-one. The inventors have further realized that not all logical references are feasible for carrier aggregation operation. The inventors have therefore suggested a solution utilizing regular handover operations in a special way for providing reliable transitions between single carrier operation and carrier aggregation operation.

According to a first aspect, there is provided a method of an access network node of a carrier aggregation enabled cellular wireless communication system. The method comprises identifying a need for an inter-band handover where a same physical frequency on which the access network node interacts with a wireless terminal device has more than one logical reference, wherein the wireless terminal device currently operates using a first logical reference. The method further comprises assigning a target frequency for the inter-band handover as a second logical reference for the physical frequency, and performing handover signalling with the wireless terminal device including the assigned target frequency.

The identifying may include identifying a carrier aggregation frequency set including the second logical reference.

The logical references may be EUTRA Absolute Radio-Frequency Channel Number, EARFCN.

The performing of the handover signalling may comprise sending a measurement configuration to the wireless terminal device including the second logical reference.

The method may comprise performing the handover such that the wireless terminal device operates on the physical frequency using the second logical reference after the handover.

According to a second aspect, there is provided a network node of an access network of a carrier aggregation enabled cellular wireless communication system, wherein the network node is arranged to identify a need for an inter-band handover where a same physical frequency on which the network node interacts with a wireless terminal device has more than one logical reference, wherein the wireless terminal device currently operates using a first logical reference. The network node is further arranged to assign the target frequency for the inter-band handover as a second logical reference for the physical frequency, and to perform handover signalling with the wireless terminal device including the assigned target frequency.

The network node may be arranged to identify a carrier aggregation frequency set including the second logical reference.

The logical references may be EUTRA Absolute Radio-Frequency Channel Number, EARFCN.

The handover signalling may comprise a measurement configuration transmission to the wireless terminal device including the second logical reference.

The network node may be arranged to perform the handover such that the wireless terminal device operates on the physical frequency using the second logical reference after the handover.

According to a third aspect, there is provided a computer program comprising instructions which, when executed on a processor of a network node of an access network of a carrier aggregation enabled cellular wireless communication system, causes the network node to perform the method according to the first aspect.

According to a fourth aspect, there is provided a method of a wireless terminal device of a carrier aggregation enabled cellular wireless communication system. The method comprises performing operation where a need for an inter-band handover occurs where a same physical frequency on which the wireless terminal device interacts with an access network node of the cellular wireless communication system has more than one logical reference, wherein the wireless terminal device currently operates using a first logical reference, and performing handover signalling with the access network node including receiving an assigned target frequency which is a second logical reference for the physical frequency.

The method may further comprise analysing mapping of the first and second logical references to observe that they relate to the same physical frequency, and, when observed that they relate to the same physical frequency, recovering measurement values made for the first logical reference and assigning the measurement values for the second logical reference.

The logical references may be EUTRA Absolute Radio-Frequency Channel Number, EARFCN.

The performing of the handover signalling may comprise receiving a measurement configuration including the second logical reference.

The method may comprise performing the handover such that the wireless terminal device operates on the physical frequency using the second logical reference after the handover.

According to a fifth aspect, there is provided a wireless terminal device of a carrier aggregation enabled cellular wireless communication system. The wireless terminal device is arranged to perform operation where a need for an inter-band handover occurs where a same physical frequency on which the wireless terminal device interacts with an access network node of the cellular wireless communication system has more than one logical reference, wherein the wireless terminal device currently operates using a first logical reference, and perform handover signalling with the access network node including receiving an assigned target frequency which is a second logical reference for the physical frequency.

The wireless terminal device may be arranged to analyse mapping of the first and second logical references to observe that they relate to the same physical frequency, and, when observed that they relate to the same physical frequency, recover measurement values made for the first logical reference and assign the measurement values for the second logical reference.

The logical references may be EUTRA Absolute Radio-Frequency Channel Number, EARFCN.

The handover signalling may include to receive a measurement configuration including the second logical reference.

The wireless terminal device may be arranged such performing of the handover is such that the wireless terminal operates on the physical frequency using the second logical reference after the handover.

According to a sixth aspect, there is provided a computer program comprising instructions which, when executed on a processor of a wireless terminal device of a carrier aggregation enabled cellular wireless communication system, causes the wireless terminal device to perform the method according to the fourth aspect.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings.

DETAILED DESCRIPTION

Figure 1:
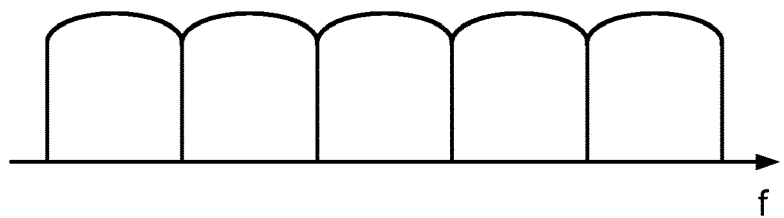
FIG. 1 schematically illustrates principles of carrier aggregation.

Carrier aggregation is used for providing increased bandwidth compared with single carriers provided by a communication system, e.g. the evolved UMTS (Universal Mobile Telecommunications System) Terrestrial Radio Access (EU-TRA). For example, the LTE Rel-10 standard can thereby support bandwidths larger than 20 MHz. One important requirement on LTE Rel-10 is to assure backward compatibility with LTE Rel-8, which only supports single carrier operation. This should also include spectrum compatibility. That would imply that an LTE Rel-10 carrier, wider than 20 MHz, should appear as a number of LTE carriers to an LTE Rel-8 terminal. Each such carrier can be referred to as a Component Carrier (CC). In particular for early LTE Rel-10 deployments it can be expected that there will be a smaller number of LTE Rel-10-capable terminals compared to many LTE legacy terminals. Therefore, it is necessary to assure an efficient use of a wide carrier also for legacy terminals, i.e. that it is possible to implement carriers where legacy terminals can be scheduled in all parts of the wideband LTE Rel-10 carrier. The straightforward way to obtain this would be by means of Carrier Aggregation (CA). CA implies that an LTE Rel-10 terminal can receive multiple CC, where the CC have, or at least the possibility to have, the same structure as a Rel-8 carrier. CA is illustrated in FIG. XX. A CA-capable UE is assigned a primary cell (PCell) which is always activated, and one or more secondary cells (SCells) which may be activated or deactivated dynamically.

It is to be noted that the terms "UE", "terminal", "mobile device", etc. are in colloquial language meaning the same item, i.e. a wireless terminal device, and are interchangeably used in this disclosure.

The number of aggregated CC as well as the bandwidth of the individual CC may be different for uplink and downlink. A symmetric configuration refers to the case where the number of CCs in downlink and uplink is the same whereas an asymmetric configuration refers to the case that the number of CCs is different. It is important to note that the number of CCs configured in a cell may be different from the number of CCs seen by a terminal: A terminal may for example support more downlink CCs than uplink CCs, even though the cell is configured with the same number of uplink and downlink CCs.

Downlink transmissions are dynamically scheduled, i.e., in each subframe the base station transmits control information about which terminals data is transmitted to and upon which resource blocks the data is transmitted, in the current downlink subframe. This control signalling is typically transmitted in the first 1, 2, 3 or 4 OFDM symbols in each subframe and the number n=1, 2, 3 or 4 is known as the Control Format Indicator (CFI). The downlink subframe also contains common reference symbols, which are known to the receiver and used for coherent demodulation of e.g. the control information.

A Physical Downlink Control CHannel (PDCCH) is used to carry downlink control information (DCI) such as scheduling decisions and power-control commands. More specifically, the DCI includes:

Downlink scheduling assignments, including Physical Downlink Shared Channel (PDSCH) resource indication, transport format, hybrid-ARQ (Automatic Repeat reQuest) information, and control information related to spatial multiplexing (if applicable). A downlink scheduling assignment also includes a command for power control of the PUCCH used for transmission of hybrid-ARQ acknowledgements in response to downlink scheduling assignments.

Uplink scheduling grants, including Physical Uplink Shared Channel (PUSCH) resource indication, transport format, and hybrid-ARQ-related information. An uplink scheduling grant also includes a command for power control of the PUSCH.

Power-control commands for a set of terminals as a complement to the commands included in the scheduling assignments/grants.

One PDCCH carries one DCI message containing one of the groups of information listed above. As multiple terminals can be scheduled simultaneously, and each terminal can be scheduled on both downlink and uplink simultaneously, there must be a possibility to transmit multiple scheduling messages within each subframe. Each scheduling message is transmitted on separate PDCCH resources, and consequently there are typically multiple simultaneous PDCCH transmissions within each subframe in each cell. Furthermore, to support different radio-channel conditions, link adaptation can be used, where the code rate of the PDCCH is selected by adapting the resource usage for the PDCCH, to match the radio-channel conditions.

In addition, a feature of carrier aggregation is the ability to perform cross-carrier scheduling. This mechanism allows a (e)PDCCH on one CC to schedule data transmissions on another CC by means of a 3-bit Carrier Indicator Field (CIF) inserted at the beginning of the (e)PDCCH messages. For data transmissions on a given CC, a UE expects to receive scheduling messages on the (e)PDCCH on just one CC— either the same CC, or a different CC via cross-carrier scheduling; this mapping from (e)PDCCH to PDSCH is also configured semi-statically. Herein, "e" and "(e)" is used for indicating particular and possible particular features for "evolved" or "enhanced" formats, i.e. particularly adapted for the LTE.

3GPP TS 36.101, V13.2.1, specifies UE requirements for certain band combinations. A UE sends its capabilities including some of these band combinations to eNB, which is then restricted to use those. The mapping between bands and physical frequencies as specified in TS 36.101, V13.2.1, is not unique. That is, more than one band can map to the same or a subset of physical frequencies, for example as the case of Band 1 and Band 4.

Due to this unambiguity, the eNB is sometimes forced to logically move a UE from one band to another to allow carrier aggregation. One way to do this while still keeping the connection to the UE is to instruct the UE to perform a handover to the same cell but on a different logical band. Note that a Rel-11 UE is required to attach to a cell on the first band it supports, and thus the only way for such a UE to have a PCell on a secondary band is through RRC signalling (handover).

For example for cells on band 38 (which has additional band 41) and band 39, inter band carrier aggregation is not possible as there is no carrier aggregation combination for band 38+39 defined in TS 36.101. A UE has to attach to primary band of a cell (if UE supports it). So if UE supports both band 38 and band 41, no carrier aggregation is possible unless eNB orders an intra-cell handover to additional band 41, which has a valid band combination with band 39.

Another limitation can be total bandwidth. The combination band 17+band 2 has a total max bandwidth of 20 MHz. So to enable carrier aggregation for two cells with e.g. bandwidth 10+15 MHz it is possible to use band 12 (additional to band 17) and band 2, which has higher possible max bandwidth.

When the UE performs a handover to a different logical frequency, e.g. a notation such as EUTRA Absolute Radio-Frequency Channel Number (EARFCN), it will typically not keep cell measurements (timing, frequency corrections, RSRP, RSRQ etc.) from the source EARFCN even if they are the same physical frequency and thus have the same cells present. This will result in a blind handover were the UE first has to establish time and frequency synch to the target cell (which in this case is the same as the source cell). During this procedure there is a risk of failing the RACH procedure and end up in a re-establishment or dropped connection. By configuring the UE to measure the target logical reference, e.g. EARFCN (which physically maps to the same physical frequency as the source EARFCN), as an inter-frequency carrier, the UE can establish time and frequency synchronization to the target cell before performing the handover. According to one embodiment, the UE analyses the mapping between the logical frequency and the physical frequency and when discovered that the physical frequency is the same for two logical frequencies, i.e. the logical frequency before handover and the target logical frequency, the UE keeps any measurement values and assigns them to the target logical frequency.

Even if the UE does not have the capability demonstrated for the embodiment above, the eNB may know that results of measurements on target logical frequency will, is fairly static environment, be the same as for the logical frequency before handover, and a stable and predictable behaviour of the inter band handover is beforehand known.

Thus, the present disclosure will be applicable for cases where both the eNB and UEs are capable of the here suggested solutions, but will also be applicable where only the eNB is capable of the here suggested solutions, i.e. legacy UEs will still benefit from the solution, although UEs capable of some of the here suggested solutions benefit from e.g. reduced energy consumption, faster processing, etc. at the inter band handover.

Figure 2:
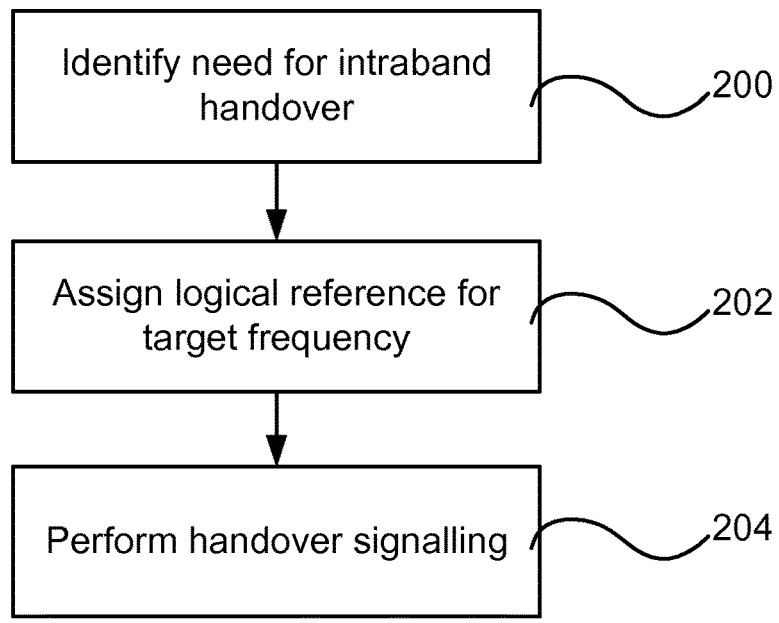
FIG. 2 is a flow chart schematically illustrating a method of an access network node according to embodiments.

FIG. 2 is a flow chart illustrating methods of an access network node of a carrier aggregation enabled cellular wireless communication system. The access network node identifies 200 a need for an inter-band handover. This is where a same physical frequency on which the access network node interacts with a wireless terminal device has more than one logical reference, and the wireless terminal device is currently operating using a first logical reference. The access network node assigns 202 a target frequency for the inter-band handover as a second logical reference for the same physical frequency, and performs 204 handover signalling with the wireless terminal device including the assigned target frequency. Thus, the access network node will provide for enabling carrier aggregation operation where the first logical reference is not available for carrier aggregation, but by an inter-band handover to the same physical frequency, the physical frequency can be included in the carrier aggregation operation. That is, the performing 204 of the handover is made such that the wireless terminal device operates on the same physical frequency but using the second logical reference after the handover.

The identifying 200 may include identifying a carrier aggregation frequency set including the second logical reference. This is for example made from a look-up table. The logical references may be EARFCN.

The performing 204 of the handover signalling may for example include sending a measurement configuration to the wireless terminal device including the second logical reference. That is, established handover mechanisms, e.g. the measurement configuration mentioned here, may be used for the inter-band handover ending with carrier aggregation at the same physical frequency.

Here, it may be noted that steps 200 and 202 are preferably performed jointly, from a timing point of view, since the interaction between assigning 202 the logical reference and identifying 200 the need for inter-band handover depends on each other in sense of the feasible logical frequency references for carrier aggregation.

Figure 3:
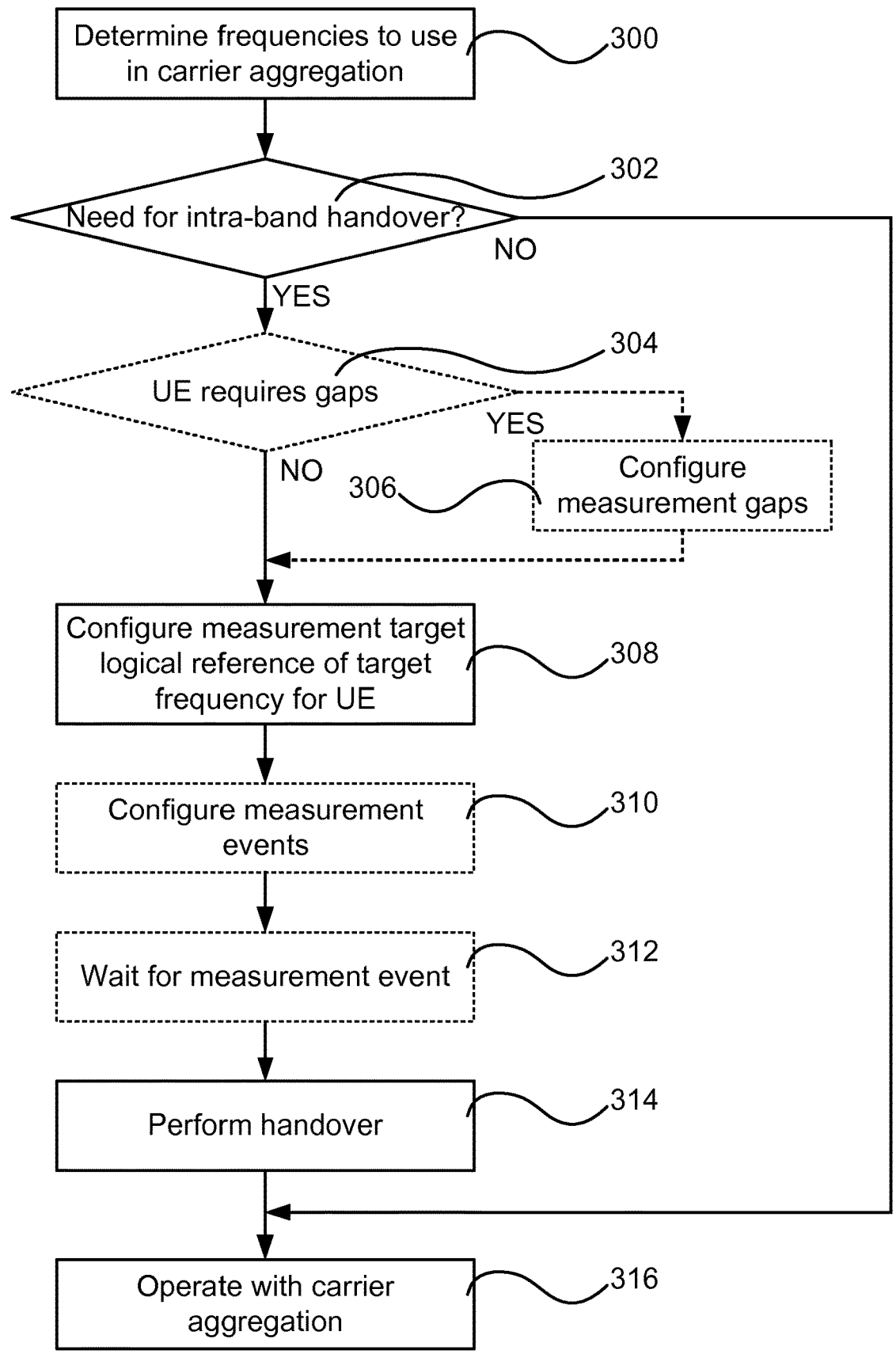
FIG. 3 is a flow chart schematically illustrating a method of an access network node according to embodiments.

FIG. 3 is a flow chart illustrating a method of an access network node according to an embodiment. While the operations demonstrated with reference to FIG. 2 on a general level, the operations demonstrated with reference to FIG. 3 are to be considered one more detailed embodiment thereof.

The access network node determines 300 frequencies to use in carrier aggregation operation. This includes determining the logical references for the frequencies, i.e. what logical references are feasible for carrier aggregation from a scheme defined for the communication network. Here, the access network node selects one of the logical references such that the physical frequency to which it refers is the same as the physical frequency currently used, if possible, which physical frequency may have another logical reference when operating in single carrier mode. The access network node then determines 302 whether there is a need for inter-band handover, i.e. if the logical reference of the currently used frequency is not feasible for the carrier aggregation. If the logical reference of the currently used frequency is feasible for the carrier aggregation, i.e. there is no need for inter-band handover, the procedure simply continues with carrier aggregation operation 316. That is, the logical reference in single carrier mode is also applicable in carrier aggregation mode, wherein the carrier aggregation operation 316 may commence using the same logical reference. Otherwise, an inter-band handover procedure 304-314 is performed, where the physical frequency is maintained, but with another logical reference. The logical references may for example be EARFCN.

Optionally, it is checked 304 whether the UE requires measurement gaps, and if so, measurement gaps are configured 306. For example, the UE has signalled a capability indicating the requirement of gaps for it to be able to perform Radio Resource Management (RRM) measurements, wherein the access network node makes a measurement gap configuration and signals to the UE, e.g. by MeasGapConfig message.

The access network node configures 308 a target logical reference on which measurements are to be made, e.g. by MeasObjectEUTRA, and signals it to the UE. The signalling may comprise the target EARFCN and the source EARFCN, which both refer to a same physical frequency although logically being considered as different frequencies. To avoid reports of other cells on this frequency, which is not the intention of the operation, the access network node may for example configure an indicator (PCI) of the Primary Cell (PCell) in a white-list, which indicates preferred cell on which measurements should be made, or configure other known neighbour cells in a black-list, which indicates cells to be omitted from measurements.

Optionally, the access network node configures 310 measurement events for the UE, e.g. A3 and/or A4. A3 is an event for triggering that a neighbour cell is a certain dB stronger than the PCell. Here, since the neighbour cell and the PCell are the same, but with different logical references, a reported Reference Signal Received Power (RSRP) should reasonably be about the same and a fairly small offset may be used. It is further to be noted that if the UE measures the cell, the reported value may differ slightly if the receiver happens to be configured differently compared with when the measurement of the source cell was made. If the UE keep previously measured values, as demonstrated below for one embodiment of the UE, there should be no difference. A4 is an event with an absolute criterion. A further alternative is that the configuration is made for periodic reporting. The configuration may be signalled as ReportConfigEUTRA to the UE. The access network node may then wait for a measurement report from the UE and then proceeds. Alternatively, the access network node is configured only to wait a predetermined time before proceeding. The proceeding includes to perform 314 the handover.

The procedure referred to as 304-310 above may be performed using a same RRCConnectionReconfiguration message.

The access network node performs 314 the handover, wherein operation 316 with carrier aggregation can commence.

Figure 4:
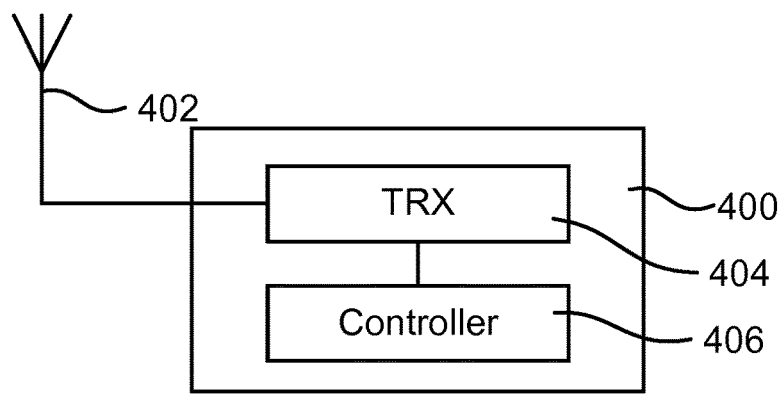
FIG. 4 is a block diagram schematically illustrating an access network node according to an embodiment.
Figure 8:
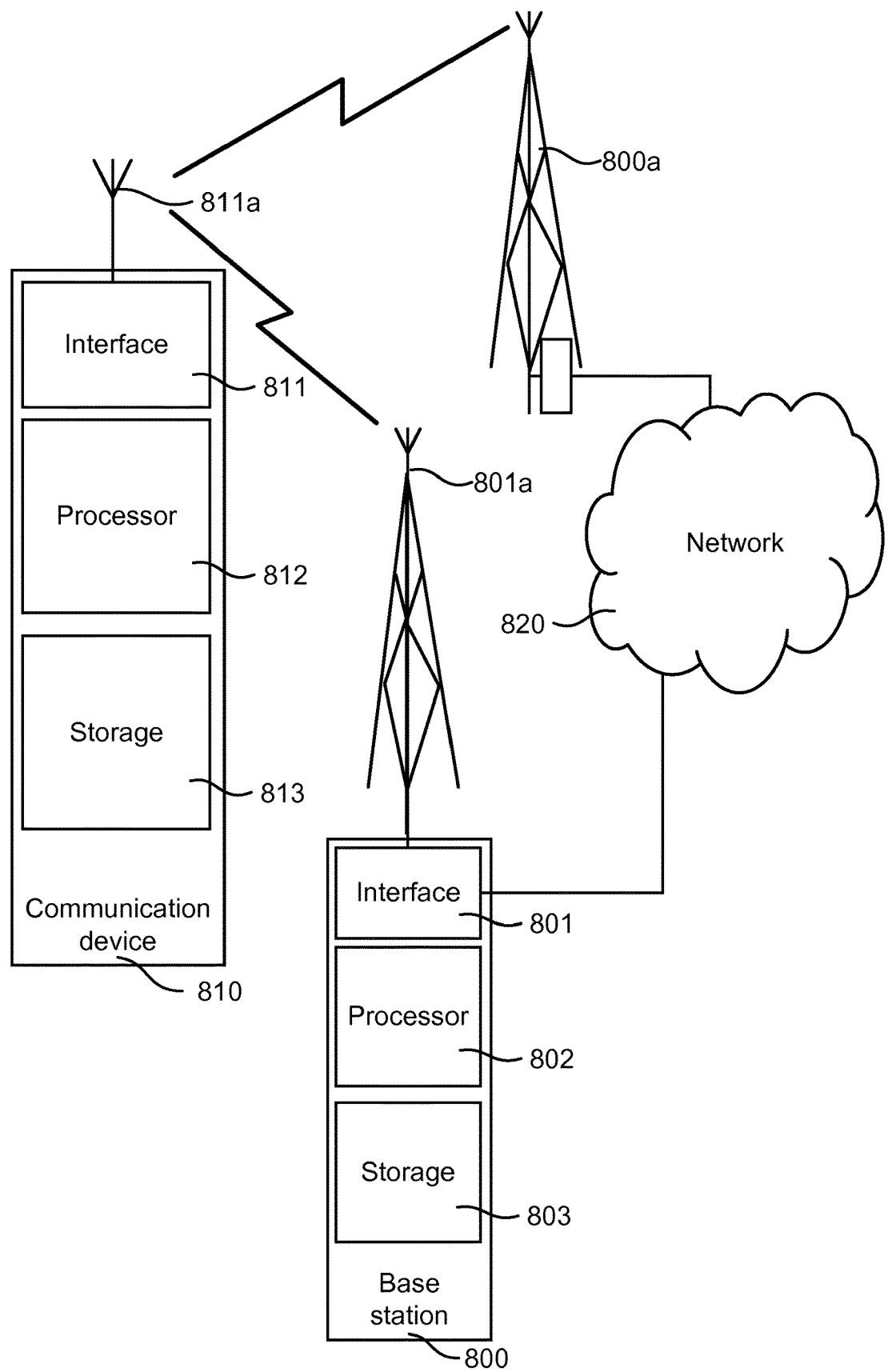
FIG. 8 schematically illustrates a cellular wireless network.

FIG. 4 is a block diagram schematically illustrating an access network node 400 according to an embodiment. The access network node 400 comprises an antenna arrangement 402, a transceiver 404 connected to the antenna arrangement 402, and a processing element 406 which may comprise one or more circuits and is arranged to operate as a controller of the access network node 400. The access network node 400 may comprise one or more input interfaces and/or one or more output interfaces arranged for enabling the access network node 400 to complete for example providing backhaul towards one or more communication networks, e.g. by signal interfaces, e.g. wireless, electrical or optical. The interfaces can also include user interfaces for enabling user interaction, for example for maintenance or configuration. The access network node 400 is arranged to operate in a wireless communication network for enabling communication with one or more terminals, as illustrated in FIG. 8. In particular, by the processing element 406 being arranged to perform any of the embodiments demonstrated with reference to FIG. 2 or 3, the access network node 400 is capable of enabling at least some of the interacting terminals to operate more reliably and predictable when inter-band handover is to be performed as demonstrated above, and possibly also with limited energy consumption since some measurement procedures may be omitted in some embodiments. The processing element 406 can also fulfill a multitude of tasks, ranging from signal processing to enable reception and transmission since it is connected to the transceiver 404, executing applications, controlling the interfaces, etc. In particular, the access network node 400 is enabled to operate with terminals capable of carrier aggregation.

As will be demonstrated below, the UE may take certain actions for facilitating the procedure at the UE end. However, the approach at the access network node is not depending on such actions. Interaction with a legacy UE will still provide advantages. Since it is well predictable that the physical frequency is well working for connection between the access network node and the UE, there is provided a reliable transition from single carrier operation to carrier aggregation operation. A handover operation to completely new physical frequency will not provide that predictability, and is thus not providing such reliability, with risk of lost connection at stake.

It should be noted that the handover as demonstrated herein may be deliberately omitted when low signal power and/or high interference is reported by the UE. In such cases, the established connection may not be put at stake for the additional bandwidth which may be gained from the carrier aggregation operation. Reporting of signal power and interference levels by the UE are preferably performed as commonly performed by legacy UEs. For example, the selection whether to omit the inter-band handover may be implemented by the reported signal power and/or interference level being compared with respective thresholds for determining whether to enable the inter-band handover as demonstrated herein. The thresholds may be selected based on experience from operation, and the thresholds may be updated continuously or periodically based on successful and unsuccessful inter-band handovers. The thresholds may also be fixed and set by a provider or an operator of the network.

Figure 5:
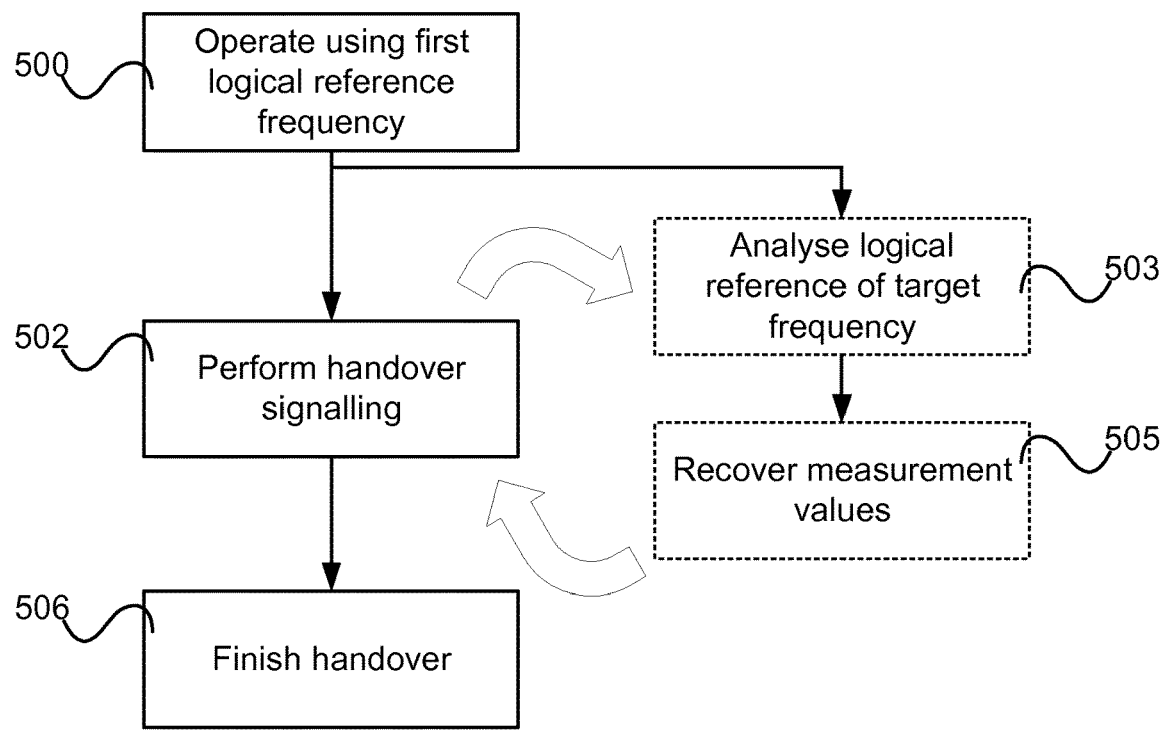
FIG. 5 is a flow chart schematically illustrating a method of a wireless terminal device according to embodiments.

FIG. 5 is a flow chart illustrating methods of a wireless terminal device of a carrier aggregation enabled cellular wireless communication system. The wireless terminal device performs 500 operation where a need for an inter-band handover occurs, as demonstrated above, where a same physical frequency on which the wireless terminal device interacts with an access network node of the cellular wireless communication system has more than one logical reference. Thus, the wireless terminal device currently operates 500 using a first logical reference. The wireless terminal device performs 502 handover signalling with the access network node including receiving an assigned target frequency which is a second logical reference for the physical frequency. Thus, the wireless terminal device, in accordance with the signalling, performs handover operations to operate on the same physical frequency but with another logical reference. This enables, where the first logical reference is not feasible for carrier aggregation operation, that carrier aggregation operation be performed, where the second logical reference is feasible for carrier aggregation, although the physical frequency is the same for both the first and the second logical references. The performing 502 of the handover signalling may include receiving a measurement configuration including the second logical reference. That is, established handover mechanisms, e.g. the measurement configuration mentioned here, may be used for the inter-band handover ending with carrier aggregation at the same physical frequency, i.e. performing the handover 506 such that the wireless terminal device operates on the same physical frequency using the second logical reference after the handover.

The wireless terminal device may make measurements etc. according to the handover signalling. However, according to some embodiments, the wireless terminal device may identify the situation and make some actions for limiting its efforts. The wireless terminal device may in such cases analyse 503 mapping of the first and second logical references to observe that they relate to the same physical frequency, and when observed that they relate to the same physical frequency, recover 505 measurement values made for the first logical reference and assigning the measurement values for the second logical reference. Here, it may be noted that the actions 503 and 505 are preferably performed in parallel with the handover operations 502 since the mutual information exchange (logical reference to frequency, measurements) depends on each other. By the recovering 505 of measurement values, the UE may save the energy consumption for making the measurements. The analysis 503 may for example be made by a table look-up, where the physical frequency of the first logical reference, as known from the operation 500, is compared with the physical frequency of the second logical reference, which is given from the handover signalling 502 and indicated by upper curved arrow. When the physical frequency is the same, the recovering 505 is performed and the recovered measurement values are provided to the handover signalling 502, as indicated by lower curved arrow.

It should be noted that the approach for the wireless terminal device demonstrated above is particularly suitable for operating together with an access network node as demonstrated with reference to FIGS. 2 to 4. However, the approach including the optional steps 503 and 505 may provide benefits also when operating with legacy access network nodes, i.e. the recovering 505 of measurement values may save efforts also in situations occurring, and being identified by the analysis 503, when operating with the legacy access network node.

Figure 6:
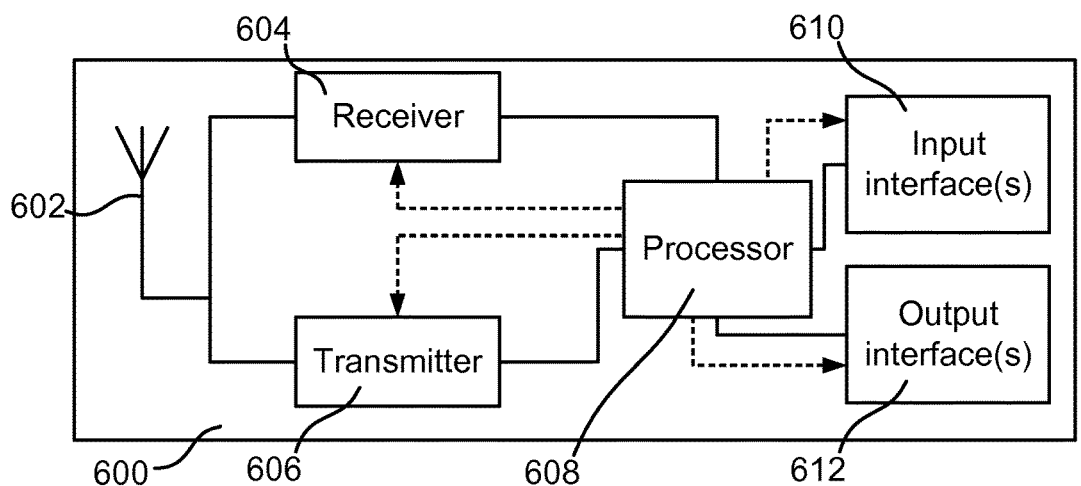
FIG. 6 is a block diagram schematically illustrating a wireless terminal device according to an embodiment.

FIG. 6 is a block diagram schematically illustrating a wireless terminal device 600 according to an embodiment. The wireless terminal device or UE 600 comprises an antenna arrangement 602, a receiver 604 connected to the antenna arrangement 602, a transmitter 606 connected to the antenna arrangement 602, a processing element 608 which may comprise one or more circuits, one or more input interfaces 610 and one or more output interfaces 612. The interfaces 610, 612 can be user interfaces and/or signal interfaces, e.g. electrical or optical. The UE 600 is arranged to operate in a cellular communication network. In particular, by the processing element 608 being arranged to perform the embodiments demonstrated with reference to FIG. 5, the UE 600 is capable of reliably transition from single carrier operation to carrier aggregation operation also when the first logical reference is not feasible for carrier aggregation operation. The processing element 608 can also fulfil a multitude of tasks, ranging from signal processing to enable reception and transmission since it is connected to the receiver 604 and transmitter 606, executing applications, controlling the interfaces 610, 612, etc. Thus, the solid lines to/from the processor 608 indicate provision of data, while the dotted line arrows indicate control provided by the processor 608.

Figure 7:
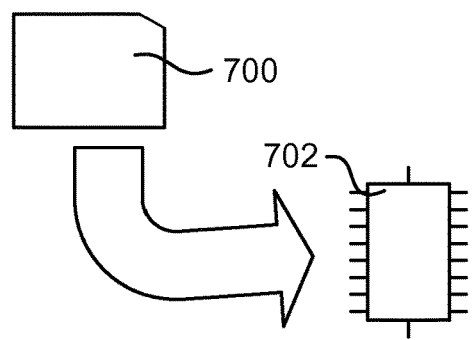
FIG. 7 schematically illustrates a computer-readable medium and a processing device.

The methods according to the present invention is suitable for implementation with aid of processing means, such as computers and/or processors, especially for the case where the controller 406 or processing element 608 demonstrated above comprises a processor handling the approaches demonstrated with reference to FIGS. 2, 3 and 5, respectively. Therefore, there is provided computer programs, comprising instructions arranged to cause the processing means, processor, or computer to perform the steps of any of the methods according to any of the embodiments described with reference to FIGS. 2, 3 and 5. The computer program preferably comprises program code which is stored on a computer readable medium 700, as illustrated in FIG. 7, which can be loaded and executed by a processing means, processor, or computer 702 to cause it to perform the methods, respectively, according to embodiments of the present invention, preferably as any of the embodiments described with reference to FIGS. 2, 3 and 5. The computer 702 and computer program product 700 can be arranged to execute the program code sequentially where actions of the any of the methods are performed stepwise, but may as well execute the actions on a real-time basis. The processing means, processor, or computer 702 is preferably what normally is referred to as an embedded system. Thus, the depicted computer readable medium 700 and computer 702 in FIG. 7 should be construed to be for illustrative purposes only to provide understanding of the principle, and not to be construed as any direct illustration of the elements.

FIG. 8 illustrates a cellular wireless network comprising a more detailed view of an access network node 800 and a communication transceiver 810, in accordance with a particular embodiment. For simplicity, FIG. 8 only depicts network 820, access network nodes 800 and 800a, and communication transceiver 810. Access network node 800 comprises processor 802, storage 803, interface 801, and antenna set 801a. Similarly, the communication transceiver 810 comprises processor 812, storage 813, interface 811 and antenna set 811a. These components may work together in order to provide access network node and/or wireless device functionality. In different embodiments, the wireless network may comprise any number of wired or wireless networks, access network nodes, base stations, controllers, wireless devices, relay stations, and/or any other components that may facilitate or participate in the communication of data and/or signals whether via wired or wireless connections.

Network 820 may comprise one or more IP networks, public switched telephone networks (PSTNs), packet data networks, optical networks, wide area networks (WANs), local area networks (LANs), wireless local area networks (WLANs), wired networks, wireless networks, metropolitan area networks, and other networks to enable communication between devices.

Access network node 800 comprises processor 802, storage 803, interface 801, and antenna set 801a. These components are depicted as single boxes located within a single larger box. In practice however, an access network node may comprise multiple different physical components that make up a single illustrated component (e.g., interface 801 may comprise terminals for coupling wires for a wired connection and a radio transceiver for a wireless connection). Similarly, access network node 800 may be composed of multiple physically separate components (e.g., a NodeB component and a Radio Network Controller (RNC) component, a Base Transceiver Station (BTS) component and a Base Station Controller (BSC) component, etc.), which may each have their own respective processor, storage, and interface components. In certain scenarios in which access network node 800 comprises multiple separate components (e.g., BTS and BSC components), one or more of the separate components may be shared among several access network nodes. For example, a single RNC may control multiple NodeB's. In such a scenario, each unique NodeB and BSC pair, may be a separate access network node. In some embodiments, access network node 800 may be configured to support multiple radio access technologies (RATs). In such embodiments, some components may be duplicated (e.g., separate storage 803 for the different RATs) and some components may be reused (e.g., the same antenna set 801a may be shared by the RATs).

Processor 802 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other access network node 800 components, such as storage 803, access network node 800 functionality. For example, processor 802 may execute instructions stored in storage 803. Such functionality may include providing various wireless features discussed herein to a wireless terminal device, such as communication transceiver 810, including any of the features or benefits disclosed herein.

Storage 803 may comprise any form of volatile or non-volatile computer readable memory including, without limitation, persistent storage, solid state memory, remotely mounted memory, magnetic media, optical media, random access memory (RAM), read-only memory (ROM), removable media, or any other suitable local or remote memory component. Storage 803 may store any suitable instructions, data or information, including software and encoded logic, utilized by access network node 800. Storage 803 may be used to store any calculations made by processor 802 and/or any data received via interface 801.

Access network node 800 also comprises interface 801 which may be used in the wired or wireless communication of signalling and/or data between access network node 800, network 820, and/or communication transceiver 810. For example, interface 801 may perform any formatting, coding, or translating that may be needed to allow access network node 800 to send and receive data from network 820 over a wired connection. Interface 801 may also include a radio transmitter and/or receiver that may be coupled to or a part of antenna set 801a. The radio may receive digital data that is to be sent out to other access network nodes or communication transceivers via a wireless connection. The radio may convert the digital data into a radio signal having the appropriate channel and bandwidth parameters. The radio signal may then be transmitted via antenna set 801a to the appropriate recipient (e.g., communication transceiver 810).

Antenna set 801a may be any type of antenna capable of transmitting and receiving data and/or signals wirelessly. Here, the antenna set 801a is to be considered as a plurality of antennas such that multi-rank transmissions are enabled. In some embodiments, antenna set 801a may comprise two or more omnidirectional, sector or panel antennas operable to transmit/receive radio signals between, for example, 700 MHz and 66 GHz. An omnidirectional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

The communication transceiver 810 may be any type of communication device, wireless device, UE, D2D device or ProSe (Proximity Service) UE, but may in general be any device, sensor, actuator, smart phone, modem, laptop, Personal Digital Assistant (PDA), tablet, mobile terminal, smart phone, laptop embedded equipped (LEE), laptop mounted equipment (LME), Universal Serial Bus (USB) dongles, machine type UE, UE capable of machine-to-machine (M2M) communication, etc., which is able to wirelessly send and receive data and/or signals to and from a access network node, such as access network node 800 and/or other communication transceivers. The communication transceiver 810 comprises processor 812, storage 813, interface 811, and antenna 811a. Like access network node 800, the components of communication transceiver 810 are depicted as single boxes located within a single larger box, however in practice a wireless device may comprise multiple different physical components that make up a single illustrated component (e.g., storage 813 may comprise multiple discrete microchips, each microchip representing a portion of the total storage capacity).

Processor 812 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in combination with other communication transceiver 810 components, such as storage 813, communication transceiver 810 functionality. Such functionality may include providing various wireless features discussed herein, including any of the features or benefits disclosed herein.

Storage 813 may be any form of volatile or non-volatile memory including, without limitation, persistent storage, solid state memory, remotely mounted memory, magnetic media, optical media, RAM, ROM, removable media, or any other suitable local or remote memory component. Storage 813 may store any suitable data, instructions, or information, including software and encoded logic, utilized by communication transceiver 810. Storage 813 may be used to store any calculations made by processor 812 and/or any data received via interface 811.

Interface 811 may be used in the wireless communication of signalling and/or data between communication transceiver 810 and access network node 800. For example, interface 811 may perform any formatting, coding, or translating that may be needed to allow communication transceiver 810 to send and receive data from access network node 800 over a wireless connection. Interface 811 may also include a radio transmitter and/or receiver that may be coupled to or a part of antenna 811a. The radio may receive digital data that is to be sent out to access network node 801 via a wireless connection. The radio may convert the digital data into a radio signal having the appropriate channel and bandwidth parameters. The radio signal may then be transmitted via antenna 811a to access network node 800.

Antenna 811a may be any type of antenna capable of transmitting and receiving data and/or signals wirelessly. In some embodiments, antenna 811a may comprise one or more omnidirectional, sector or panel antennas operable to transmit/receive radio signals between 2 GHz and 66 GHz. For simplicity, antenna 811a may be considered a part of interface 811 to the extent that a wireless signal is being used.

In some embodiments, the components described above may be used to implement one or more functional modules used in D2D communication. The functional modules may comprise software, computer programs, sub-routines, libraries, source code, or any other form of executable instructions that are run by, for example, a processor. In general terms, each functional module may be implemented in hardware and/or in software. Preferably, one or more or all functional modules may be implemented by processors 812 and/or 802, possibly in cooperation with storage 813 and/or 803. Processors 812 and/or 802 and storage 813 and/or 803 may thus be arranged to allow processors 812 and/or 802 to fetch instructions from storage 813 and/or 803 and execute the fetched instructions to allow the respective functional module to perform any features or functions disclosed herein. The modules may further be configured to perform other functions or steps not explicitly described herein but which would be within the knowledge of a person skilled in the art.

Certain aspects of the inventive concept have mainly been described above with reference to a few embodiments. However, as is readily appreciated by a person skilled in the art, embodiments other than the ones disclosed above are equally possible and within the scope of the inventive concept. Similarly, while a number of different combinations have been discussed, all possible combinations have not been disclosed. One skilled in the art would appreciate that other combinations exist and are within the scope of the inventive concept. Moreover, as is understood by the skilled person, the herein disclosed embodiments are as such applicable also to other standards and communication systems and any feature from a particular figure disclosed in connection with other features may be applicable to any other figure and or combined with different features.

The invention claimed is:

1. A method of operating an access network node of a carrier aggregation enabled cellular wireless communication system, the method comprising the network node:
   identifying a need for an inter-band handover where a same physical frequency, on which the access network node interacts with a wireless terminal device, has at least two logical references, wherein the wireless terminal device communicates with the access network node using a first logical reference prior to the inter-band handover;
   assigning a target logical frequency for the inter-band handover as a second logical reference for the same physical frequency, wherein the wireless device uses the second logical frequency to communicate with the access network node after the inter-band handover;
   assigning measurement values for the first logical frequency to the second logical frequency; and
   performing handover signaling with the wireless terminal device including the assigned target logical frequency.

2. The method of claim 1, wherein the identifying includes identifying a carrier aggregation frequency set including the second logical reference.

3. The method of claim 1, wherein the logical references are evolved UMTS (Universal Mobile Telecommunications System) Terrestrial Radio Access (EUTRA) Absolute Radio-Frequency Channel Number (EARFCN).

4. The method of claim 1, wherein the performing the handover signaling comprises sending a measurement configuration to the wireless terminal device including the second logical reference.

5. The method of claim 1, further comprising performing the handover such that the wireless terminal device operates on the physical frequency using the second logical reference after the handover.

6. A network node of an access network of a carrier aggregation enabled cellular wireless communication system, the network node comprising:
   processing circuitry;
   memory containing instructions executable by the processing circuitry whereby the network node is operative to:
      identify a need for an inter-band handover where a same physical frequency, on which the network node interacts with a wireless terminal device, has at least two logical references, wherein the wireless terminal device communicates with the access network node using a first logical reference prior to the inter-band handover;
      assign the target logical frequency for the inter-band handover as a second logical reference for the same physical frequency, wherein the wireless device uses the second logical frequency to communicate with the access network node after the inter-band handover;

assign measurement values for the first logical frequency to the second logical frequency; and perform handover signaling with the wireless terminal device including the assigned target logical frequency.

7. The network node of claim 6, wherein the instructions are such that the network node is operative to identify a carrier aggregation frequency set including the second logical reference.

8. The network node of claim 6, wherein the logical references are evolved UMTS (Universal Mobile Telecommunications System) Terrestrial Radio Access (EUTRA) Absolute Radio-Frequency Channel Number (EARFCN).

9. The network node of claim 6, wherein the handover signaling comprises a measurement configuration transmission to the wireless terminal device including the second logical reference.

10. The network node of claim 6, wherein the instructions are such that the network node is operative to perform the handover such that the wireless terminal device operates on the physical frequency using the second logical reference after the handover.

11. A method of operating a wireless terminal device of a carrier aggregation enabled cellular wireless communication system, the method comprising the wireless terminal device:

performing an operation where a need for an inter-band handover occurs where a same physical frequency on which the wireless terminal device interacts with an access network node of the cellular wireless communication system has at least two logical references, wherein the wireless terminal device communicates with the access network node using a first logical reference prior to the inter-band handover; and performing handover signaling with the access network node including receiving an assigned target logical frequency which is a second logical reference for the same physical frequency, wherein the wireless device uses the second logical frequency to communicate with the access network node after the inter-band handover and wherein measurement values for the first logical frequency are assigned to the second logical frequency.

12. The method of claim 11, further comprising the wireless terminal device:

analyzing mapping of the first and second logical references to observe that they relate to the same physical frequency; and in response to observing that they relate to the same physical frequency, recovering measurement values made for the first logical reference and assigning the measurement values for the second logical reference.

13. The method of claim 11, wherein the logical references are evolved UMTS (Universal Mobile Telecommunications System) Terrestrial Radio Access (EUTRA) Absolute Radio-Frequency Channel Number (EARFCN).

14. The method of claim 11, wherein the performing handover signaling comprises receiving a measurement configuration including the second logical reference.

15. The method of claim 11, further comprising the wireless terminal device performing the handover such that the wireless terminal device operates on the physical frequency using the second logical reference after the handover.

16. A wireless terminal device of a carrier aggregation enabled cellular wireless communication system, the wireless terminal device comprising:

processing circuitry;

memory containing instructions executable by the processing circuitry whereby the wireless terminal device is operative to:

perform an operation where a need for an inter-band handover occurs where a same physical frequency on which the wireless terminal device interacts with an access network node of the cellular wireless communication system has at least two logical references, wherein the wireless terminal device communicates with the access network node using a first logical reference prior to the inter-band handover; and perform handover signaling with the access network node including receiving an assigned logical frequency which is a second logical reference for the same physical frequency, wherein the wireless device uses the second logical frequency to communicate with the access network node after the inter-band handover and wherein measurement values for the first logical frequency are assigned to the second logical frequency.

17. The wireless terminal device of claim 16, wherein the instructions are such that the wireless terminal device is operative to:

analyze mapping of the first and second logical references to observe that they relate to the same physical frequency; and in response to observing that they relate to the same physical frequency, recover measurement values made for the first logical reference and assign the measurement values for the second logical reference.

18. The wireless terminal device of claim 16, wherein the logical references are evolved UMTS (Universal Mobile Telecommunications System) Terrestrial Radio Access (EUTRA) Absolute Radio-Frequency Channel Number (EARFCN).

19. The wireless terminal device of claim 16, wherein the performing the handover signaling includes receiving a measurement configuration including the second logical reference.

20. The wireless terminal device of claim 16, wherein the instructions are such that the wireless terminal device is operative perform the handover is such that the wireless terminal operates on the physical frequency using the second logical reference after the handover.

* * * * *